(12) United States Patent
Supkis et al.

(10) Patent No.: US 6,749,179 B2
(45) Date of Patent: Jun. 15, 2004

(54) DEVICES AND METHODS FOR PLACING WIRING INTO SPLIT LOOM TUBING

(75) Inventors: Daniel E. Supkis, Houston, TX (US); Jens G. Boving, Houston, TX (US); Mark Bushman, Houston, TX (US)

(73) Assignee: Board of Regents, The University of Texas System, Austin, TX (US)

( * ) Notice: Subject to any disclaimer, the term of this patent is extended or adjusted under 35 U.S.C. 154(b) by 0 days.

(21) Appl. No.: 10/098,187

(22) Filed: Mar. 13, 2002

(65) Prior Publication Data

US 2003/0173555 A1 Sep. 18, 2003

(51) Int. Cl.[7] .............................................. B65B 35/03
(52) U.S. Cl. ........................ 254/134.3 R; 254/134.3 FT
(58) Field of Search ................. 254/134.3 R, 134.3 FT; 285/132.1; 29/241

(56) References Cited

U.S. PATENT DOCUMENTS

| | | | | |
|---|---|---|---|---|
| 3,788,336 A | * | 1/1974 | Steffes | ........................ 135/118 |
| 3,802,049 A | * | 4/1974 | Hennessey, Jr. | .............. 29/764 |
| 3,874,061 A | | 4/1975 | Gauthier | |
| 4,185,424 A | * | 1/1980 | Streit | ........................... 52/103 |
| 4,399,842 A | | 8/1983 | Gibbons | |
| 4,416,059 A | | 11/1983 | Humphrey et al. | |
| 4,552,338 A | | 11/1985 | Lindgren | |
| 4,663,838 A | | 5/1987 | Dewey et al. | |
| 4,682,412 A | | 7/1987 | Pfeffer | |
| 4,715,100 A | | 12/1987 | Cross | |
| 4,951,923 A | * | 8/1990 | Couture | ............... 254/134.3 R |
| 5,011,332 A | | 4/1991 | Kunze et al. | |
| 5,187,861 A | | 2/1993 | Hillegondis et al. | |
| 5,228,179 A | | 7/1993 | Fukuda et al. | |
| 5,265,326 A | | 11/1993 | Scribner | |
| 5,412,855 A | | 5/1995 | Koch | |
| D359,208 S | | 6/1995 | Ivey | |
| 5,431,370 A | * | 7/1995 | Verkuylen et al. | .. 254/134.3 FT |
| 5,561,898 A | | 10/1996 | White et al. | |
| 5,582,392 A | | 12/1996 | Bajric et al. | |
| 5,598,617 A | | 2/1997 | Ritter et al. | |
| D382,454 S | | 8/1997 | McMahon | |
| 5,709,025 A | | 1/1998 | Wuyts | |
| 5,884,901 A | | 3/1999 | Schilling | |
| 6,007,051 A | | 12/1999 | Cartwright et al. | |

FOREIGN PATENT DOCUMENTS

| | | |
|---|---|---|
| JP | 02231908 | 9/1990 |
| JP | 05326101 | 12/1993 |
| JP | 08308052 | 11/1996 |
| JP | 10145923 | 5/1998 |

* cited by examiner

Primary Examiner—Joseph J. Hail, III
Assistant Examiner—Daniel Shanley
(74) Attorney, Agent, or Firm—Fulbright & Jaworski L.L.P.

(57) ABSTRACT

Apparatuses, systems, and methods for placing one or more wires into split loom tubing. An apparatus is provided that includes a partial enclosure, a longitudinal channel, and a flared wedge. The partial enclosure has a proximal end and a distal end. The longitudinal channel runs from the proximal end to the distal end, and the channel has a width sufficient to guide a wire as it is placed into the split loom tubing. The flared wedge is coupled to the proximal end and has a width sufficient to stretch open an interior of the split loom tubing to facilitate transferring the wire from the channel into the split loom tubing. In operation, the split loom tubing is loaded with wiring by inserting the apparatus into the interior of the split loom tubing and by moving the apparatus along the length of the split loom tubing. This movement quickly and effectively deposits the wiring into the split loom tubing.

20 Claims, 2 Drawing Sheets

DEVICES AND METHODS FOR PLACING WIRING INTO SPLIT LOOM TUBING

BACKGROUND OF THE INVENTION

1. Field of the Invention

The present invention relates generally to the fields of wiring and wire management. More particularly, it concerns methods and apparatuses for placing wiring into split loom tubing.

2. Description of Related Art

As more equipment requires wiring to operate, the management of those wires becomes important. Having an excessive number of loose wires in an area is not only unsightly, but can also be dangerous. In particular, loose wires may present a tripping hazard. Additionally, loose wires may wrap around and tangle with other equipment, which may make it difficult if not impossible to operate that other equipment.

In view of at least the foregoing, several devices have been introduced for managing or organizing loose wires. One of the most popular and prevalent among these is split loom tubing. Generally speaking, split loom tubing is a tube that has a split running along its length. Wires may be placed within the tube by inserting them through the split. Once inserted, the tube holds the wires together in one place, reducing the mess (and hazards) associated with loose wires. Most typically, split loom tubing is made of flexible, corrugated plastic, similar in appearance to the tubing commonly found on vacuum cleaners and/or their attachments.

Although useful in managing loose wiring, split loom tubing is often difficult to "load." Specifically, inserting wires into the tubing, through its split, may be problematic in its own rite. Depending upon the tightness of the split, the user may have to use two hands to load the wire—one hand to hold open the tubing while the other hand feeds the wire into the tubing. Further, many times the tubing may twist during loading, which forces the user again to use two hand—one hand to keep the tubing straight (untwisting it) while the other hand feeds the wire. Still further, the act of manually inserting the wiring into the tubing may cut a user's hands. Yet still further, the entire process of loading wires into the tubing may be very time consuming and, given the other problems listed above, frustrating.

In view of the foregoing, it would be advantageous to have an apparatus to facilitate the loading of wiring into split loom tubing.

The referenced shortcomings listed above are not intended to be exhaustive, but rather are among many that tend to impair the effectiveness of previously known techniques concerning wire management. Other noteworthy problems may also exist; however, those mentioned here are sufficient to demonstrate that methodology appearing in the art have not been altogether satisfactory and that a need exists for the technology disclosed herein.

SUMMARY OF THE INVENTION

Shortcomings listed above are reduced or eliminated by the techniques disclosed herein. These techniques are applicable to a vast number of applications, including any application involving wires that require management.

In one embodiment, the invention is an apparatus for placing a wire into split loom tubing. The apparatus includes a partial enclosure, a longitudinal channel, and a flared wedge. The partial enclosure has a proximal end and a distal end. The longitudinal channel runs from the proximal end to the distal end, and the channel has a width sufficient to guide the wire as it is placed into the split loom tubing. The flared wedge is coupled to the proximal end, and the wedge has a width sufficient to stretch open an interior of the split loom tubing to facilitate transferring the wire from the channel into the split loom tubing.

In other embodiments, the partial enclosure may include a cylindrical tube. The partial enclosure may have a length of about 6 inches. The channel may have a width of about 0.25 inches. The flared wedge may have a shape of an arrow-head. The flared wedge may have a maximum width of about ⅞ inches. The flared wedge may have a wedge angle of about 15 degrees. The flared wedge may be welded to the proximal end of the partial enclosure. The flared wedge may be integral with the proximal end of the partial enclosure.

In another embodiment, the invention is a wire enclosure system, including the apparatus described above along with split loom tubing.

In another embodiment, the invention is an apparatus for placing a wire into split loom tubing, including a cylindrical tube, a longitudinal channel, and a flared wedge. The cylindrical tube has a proximal end and a distal end. The longitudinal channel runs from the proximal end to the distal end, and the channel has a width between about ¹/₁₆ inches and about 0.5 inches and is configured to guide the wire as it is placed into the split loom tubing. The flared wedge is coupled to the proximal end, and the wedge has a wedge angle between about 5 degrees and about 30 degrees and a maximum width between about ⅙ inches and about 1.5 inches. The flared wedge is configured to stretch open an interior of the split loom tubing to facilitate transferring of the wire from the channel into the split loom tubing.

In other embodiments, the cylindrical tube may have a length of about 6 inches. The flared wedge may have a shape of an arrow-head. The flared wedge may be integral with the proximal end of the cylindrical tube.

In another embodiment, the invention is a method for placing a wire into split loom tubing. An apparatus is obtained, which includes a partial enclosure, a longitudinal channel, and a flared wedge. The partial enclosure has a proximal end and a distal end. The longitudinal channel runs from the proximal end to the distal end, and the flared wedge is coupled to the proximal end. At least a portion of the wire is placed into the channel. The flared wedge is inserted into the split loom tubing to stretch open an interior of the split loom tubing. And, the flared wedge is moved along the length of the interior of the split loom tubing to guide the wire into the split loom tubing.

As used herein, "wire" and "wiring" shall be interpreted broadly to encompass cables, lines, leads, and the like. It should be noted that in this document (including the claims), the terms "comprise" (and any form thereof, such as "comprises" and "comprising"), "have" (and any form thereof, such as "has" and "having"), and "include" (and any form thereof, such as "includes" and "including") are open-ended transitional terms. Thus, a thing (such as a device or a system) that "comprises," "has," or "includes" one or more elements possesses those one or more elements, but is not limited to only possessing those one or more elements. For example, claims directed to an apparatus for placing "a" wire into split loom tubing encompass apparatuses in which more than one wire is placed into split loom tubing.

Other features and associated advantages will become apparent with reference to the following detailed description of specific embodiments in connection with the accompanying drawings.

BRIEF DESCRIPTION OF THE DRAWINGS

The following drawings form part of the present specification and are included to further demonstrate certain aspects of the present invention. The invention may be better understood by reference to one or more of these drawings in combination with the detailed description of specific embodiments presented herein.

DESCRIPTION OF ILLUSTRATIVE EMBODIMENTS

Figure 1:
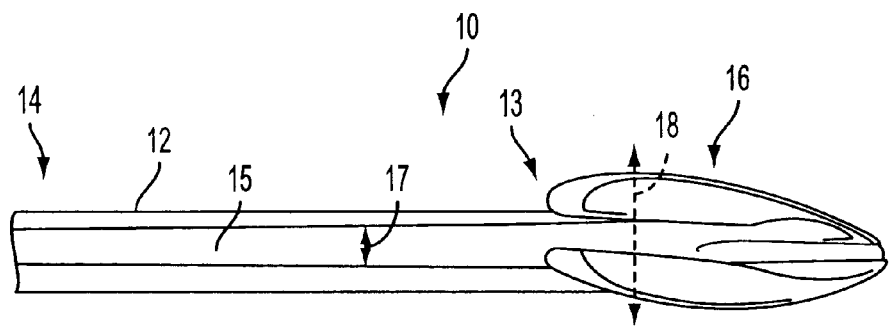
FIG. 1 is a diagram showing a top-view of an apparatus for loading a wire in accordance with embodiments of the present disclosure.

The present disclosure describes apparatuses, systems, and methods for wire management. With the benefit of this disclosure, one may easily, rapidly, reliably, and safely place wires into any split loom tubing. Accordingly, effective wire management may be readily achieved.

The techniques described herein are advantageous for any type of wire management. In particular, wire management applications may include but are not limited to: medical applications (including the management of wires in operating rooms), military applications, naval applications, automotive applications, and general consumer electronics applications. With the benefit of the present disclosure, those having skill in the art will comprehend that techniques claimed herein may be modified and applied to a number of additional, different applications. The claims attached hereto cover all such modifications that fall within the scope and spirit of this disclosure.

FIGS. 1–5 illustrate a suitable, exemplary design and operation of an apparatus 10 for loading a wire in accordance with embodiments of the present disclosure. Apparatus 10 includes a partial enclosure 12. This section of apparatus 10 is deemed a "partial" enclosure because it partially encloses or supports a wire 42 (see FIGS. 4 and 5) that is to be placed into split loom tubing 52 (see FIG. 5). Partial enclosure 12, in one embodiment, may be a cylindrical tube (as illustrated in the figures such as FIG. 3). In other embodiments, the cross section of partial enclosure 12 may be rectangular, polygonal, or any other suitable shape for partially enclosing one or more wires. In one embodiment, partial enclosure 12 may be made from metal such as brass. In other embodiments, however, any other suitable material may be used such as, but not limited to, plastic, aluminum, copper, nickel, titanium, steel, silver, iron, gold, or an alloy. In one embodiment, the partial enclosure 12 has a length of about 6 inches, but in other embodiments, the length may vary greatly, depending on preference. In one embodiment, partial enclosure 12 may be made from tubing and have an outer diameter of about 0.5 inches and an inner diameter of about ⅜ inches, but in other embodiments, these dimensions may vary greatly, depending on preference. The partial enclosure 12 has a proximal end 13 and a distal end 14. The proximal end is so-deemed since it is the end that is first placed within the split loom tubing 52 (see FIG. 5).

Apparatus 10 includes a longitudinal channel 15. The longitudinal channel runs longitudinally along partial enclosure 12 and acts to accommodate and guide one or more wires to be placed into split loom tubing 52. The width 17 of longitudinal channel 15 (see FIG. 1) may constitute, in one embodiment, a slot of about 0.25 inches. This width 17 is particularly well suited for embodiments in which apparatus 10 is designed to insert wires of a size commonly found in operating rooms into split loom tubing 52 one-wire-at-a-time. In embodiments in which apparatus 10 is configured to load multiple wires at once, longitudinal channel 15 may be formed to have a greater width. In embodiments in which the wire(s) to be loaded into split loom tubing 52 are narrow, the width 17 may be made to be correspondingly smaller.

Longitudinal channel 15 illustrated in the figures is cylindrical in shape. However, those having skill in the art will recognize that the shape may be rectangular, polygonal, or any other form suitable for accommodating and guiding the wire(s) to be inserted into the split loom tubing 52. In different embodiments, the surface of longitudinal channel 15 may be treated to make the surface smoother to facilitate the sliding of the one or more wires from the apparatus 10 into the split loom tubing 52. For instance, the surface of longitudinal channel 15 may be coated, in one embodiment, with a material such as TEFLON.

Apparatus 10 includes a flared wedge 16 (see FIGS. 1–4). As illustrated, flared wedge is adjacent proximal end 13 of the partial enclosure 12. In one embodiment, the flared wedge 16 is coupled to the proximal end 13. In such an embodiment, welding or another suitable binding method may be used to connect the flared wedge directly or indirectly to the proximal end 13 of the partial enclosure 12. In another embodiment, the flared wedge 16 may be made integral with the partial enclosure 12. For instance, the flared wedge and the partial enclosure 12 may be formed from a single piece of molded plastic or other material.

Figure 3:
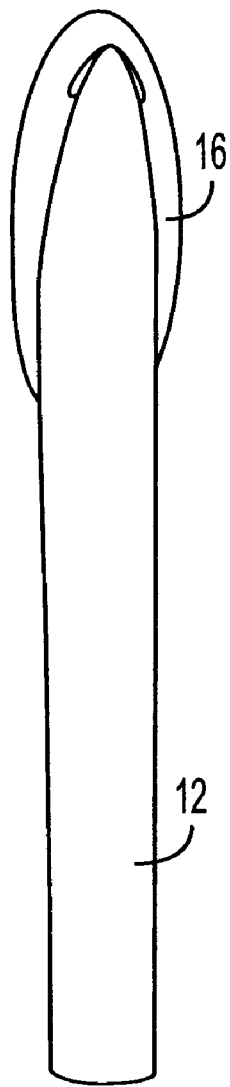
FIG. 3 is a diagram showing a bottom-view of an apparatus for loading a wire in accordance with embodiments of the present disclosure.

Flared wedge 16 is termed "flared" because its width flares out from the width of the partial enclosure 12 (see, e.g., FIG. 3). In other words, at least a portion of the flared wedge 16 has a width that is greater than that of the partial enclosure 12. The shape of the flared wedge 16 may be any shape suitable to stretch open an interior of split loom tubing 52 to facilitate transferring one or more wires (such as wire 42 of FIGS. 4–5) into the split loom tubing 52. In the embodiments shown, the shape of flared wedge 16 is that of an arrow-head (flaring outwards towards its base and becoming more narrow at its tip). Such a shape has been found to be effective in opening the interior of split loom tubing of a size suitable to contain operating room wires. However, those of skill in the art having the benefit of this disclosure will recognize that any other shape suitable for opening an interior of split loom tubing 52 may suffice. In one embodiment, flared wedge 16 may have a maximum width 18 (see FIG. 1) of about ⅞ inches and a thickness of about ⅛ inches. In other embodiments, that width and thickness may vary greatly depending upon preference or application. For instance, in embodiments suited for a larger split loom tubing 52, the maximum width 18 of flared wedge 16 may be made to be correspondingly larger. Likewise, in embodiments suited for a smaller split loom tubing 52, maximum width 18 of flared wedge 16 may be made to be correspondingly smaller.

Figure 2:
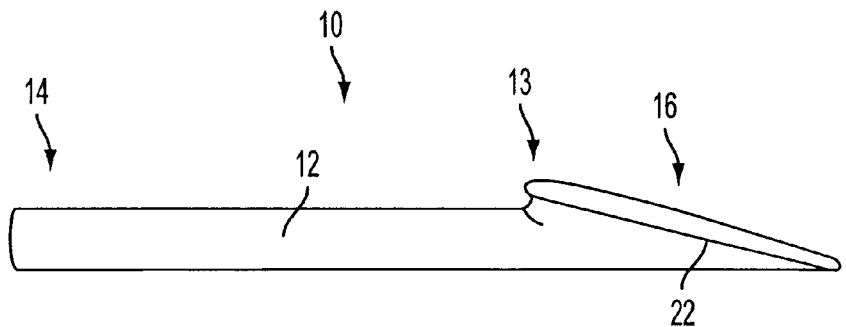
FIG. 2 is a diagram showing a side-view of an apparatus for loading a wire in accordance with embodiments of the present disclosure.
Figure 5:
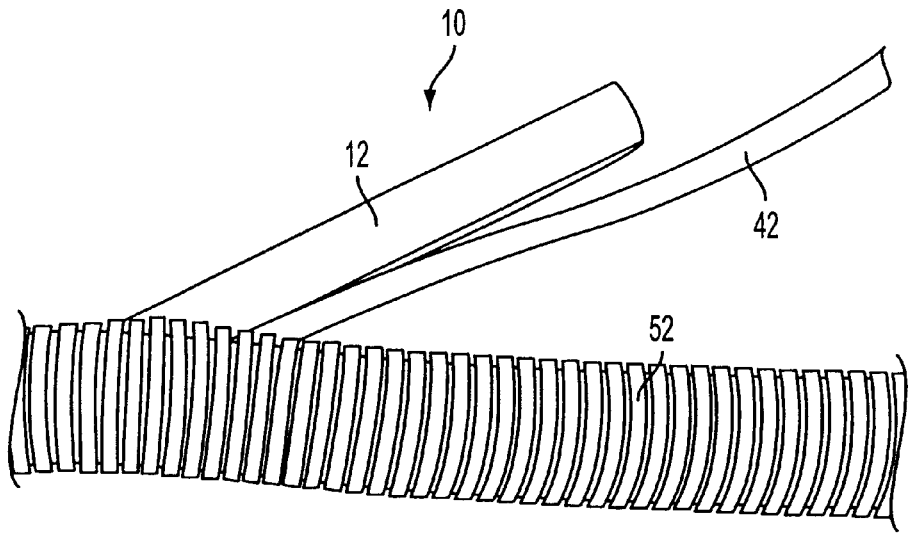
FIG. 5 is a diagram showing the operation of an apparatus for loading a wire in accordance with embodiments of the present disclosure.

Flared wedge 16 is termed a "wedge" because it generally has the shape of a wedge, having an associated wedge angle 22 (see FIG. 2). The wedge shape of flared wedge 16 is believed to facilitate both the quick transfer of wire into split loom tubing 52, and also the insertion and removal of apparatus 10 from the split loom tubing 52. Turning to FIG. 5, it is apparent that the wedge shape contributes to more natural operation of apparatus 10. In particular, flared wedge 16 ensures that a user loads wire into split loom tubing 52 at an angle. Because of its wedge shape, flared wedge 16 loads wiring flatly into the bottom of split loom tubing while the apparatus is held at an angle; this angled operation is both convenient and comfortable for the user and makes quick work of loading even long wires into the tubing. In one embodiment, wedge angle 22 may be about 15 degrees. However, in other embodiments, the angle may vary widely. For instance, it is contemplated that wedge angle 22 may range anywhere from about 1 degree to at least about 50 degrees.

Figure 4:
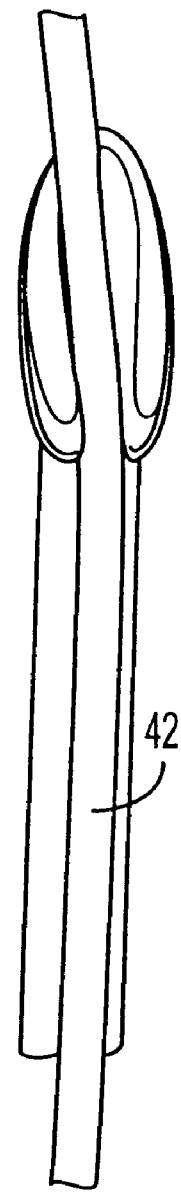
FIG. 4 is a diagram showing a top-view of an apparatus for loading a wire, including the wire to be loaded, in accordance with embodiments of the present disclosure.

FIG. 5 illustrates the operation of apparatus 10 according to one embodiment of this disclosure. To use apparatus 10, one first places one or more wires into the longitudinal channel 15. FIG. 4 shows the placement of one wire 42 into channel 15. In one embodiment, the placement of one or more wires into apparatus 10 may simply involve pressing the apparatus 10 over those wires to force them into the longitudinal channel 15. In other embodiments, the wires may be more carefully placed into the channel by hand. With the wires in the longitudinal channel 15, one inserts apparatus 10, proximal end 13 first, into split loom tubing 52. The flared, wedge shape of flared wedge 16 facilitates this insertion. Upon its insertion, the flared shape of wedge shape 16 stretches open an interior of the split loom tubing. The wedge shape of flared wedge 16 ensures that the partial enclosure 12 juts out of the split loom tubing at an angle, which facilitates the use of apparatus 10. In one embodiment, the insertion of flared wedge 16 may simply involve pressing downward on the split of the split loom tubing 52 until apparatus 10 is thereby inserted. Thus, in one embodiment, both the loading of wire(s) into longitudinal channel 15 and the insertion of apparatus 10 into split loom tubing 52 may involve the pressing of apparatus 10 onto one or more wires and the pressing of that apparatus onto the split of the split loom tubing 52.

Once apparatus 10 is inserted into split loom tubing 52 with one or more wires (such as wire 42 of FIGS. 4–5), one loads the wire(s) into the split loom tubing. In one embodiment, this is accomplished by holding onto partial enclosure 12 and moving the apparatus 10 along the length of the split loom tubing 52 to guide and deposit the wire(s) into the split loom tubing 52. As one moves the apparatus 10 along the length of split loom tubing 52, the wiring is automatically deposited therein. Advantageously, this process may be done very quickly—as quickly as one can move the apparatus 10. Advantageously, this process need not involve two hands. Advantageously, this process avoids cuts to the hands caused by rubbing against the slit of the split loom tubing. In sum, the use of apparatus 10 solves many, if not all, of the problems that used to make loading a split loom tubing both frustrating and time consuming.

The embodiments describe above were included to demonstrate specific embodiments of this disclosure. It should be appreciated by those of skill in the art that the techniques disclosed herein represent techniques discovered by the inventor to function well in the practice of the invention, and thus can be considered to constitute specific modes for its practice. In particular, the specific dimensions provided in conjunction with the figures are not limiting, and have been presented simply as an example for an apparatus suited to load split loom tubing of about 1 inch. Split loom tubing, however, comes in various sizes ranging from at least 0.25 inches to 1.5 inches. Thus, it should be noted that the dimensions in this application are exemplary only and may be scaled as needed, as will be recognized by those having skill in the art, to accommodate different sizes of split loom tubing and/or according to preference.

Those of skill in the art should, in light of the present disclosure, appreciate that many changes can be made in the specific embodiments which are disclosed and still obtain a like or similar result without departing from the spirit and scope of the invention.

What is claimed is:

1. An apparatus for placing a wire into split loom tubing, comprising:

a partial enclosure having a proximal end and a distal end;

a longitudinal channel running from the proximal end to the distal end, the channel having a width sufficient to guide the wire as it is placed into the split loom tubing; and a flared wedge coupled to the proximal end, the wedge having a width sufficient to stretch open an interior of the split loom tubing to facilitate transferring the wire from the channel into the split loom tubing, and the wedge tapering inward towards an opening of the channel at the proximal end of the partial enclosure.

2. The apparatus of claim 1, wherein the partial enclosure comprises a cross-section that is circular, rectangular, or polygonal.

3. The apparatus of claim 1, wherein the partial enclosure has a length of about 6 inches.

4. The apparatus of claim 1, wherein the channel has a width of about 0.25 inches.

5. The apparatus of claim 1, wherein the flared wedge has a shape of an arrow-head.

6. The apparatus of claim 1, wherein the flared wedge has a maximum width of about ⅞ inches.

7. The apparatus of claim 1, wherein the flared wedge has a wedge angle of about 15 degrees.

8. The apparatus of claim 1, wherein the flared wedge is welded to the proximal end of the partial enclosure.

9. The apparatus of claim 1, wherein the flared wedge is integral with the proximal end of the partial enclosure.

10. A wire enclosure system, comprising:

a partial enclosure having a proximal end and a distal end;

a longitudinal channel running from the proximal end to the distal end, the channel having a width sufficient to guide the wire as it is placed into the split loom tubing;

a flared wedge coupled to the proximal end, the wedge having a width sufficient to stretch open an interior of the split loom tubing to facilitate transferring the wire from the channel into the split loom tubing; and split loom tubing.

11. The system of claim 10, wherein the partial enclosure comprises a cross section that is circular, rectangular, or polygonal.

12. An apparatus for placing a wire into split loom tubing, comprising:

a cylindrical tube having a proximal end and a distal end;

a longitudinal channel running from the proximal end to the distal end, the channel having a width between about 1/16 inches and about 0.5 inches and being configured to guide the wire as it is placed into the split loom tubing; and a flared wedge coupled to the proximal end, the wedge having a wedge angle between about 5 degrees and about 30 degrees and a maximum width between about 1/8 inches and about 1.5 inches, the flared wedge being configured to stretch open an interior of the split loom tubing to facilitate transferring of the wire from the channel into the split loom tubing.

13. The apparatus of claim 12, wherein the cylindrical tube has a length of about 6 inches.

14. The apparatus of claim 12, wherein the flared wedge has a shape of an arrow-head.

15. The apparatus of claim 12, wherein the flared wedge is integral with the proximal end of the cylindrical tube.

16. The apparatus of claim 12, wherein the flared wedge is welded to the proximal end of the partial enclosure.

17. An apparatus for placing a wire into split loom tubing, comprising:

a partial enclosure;

a channel running longitudinally across the partial enclosure, the channel having a width sufficient to guide the wire as it is placed into the split loom tubing; and a flared wedge coupled to the partial enclosure, the wedge having a width sufficient to stretch open an interior of the split loom tubing to facilitate transferring the wire from the channel into the split loom tubing;

wherein the partial enclosure bends inward, or the wedge tapers inward towards an opening of the channel at a ion intermediate point of the apparatus.

18. The apparatus of claim 17, wherein the partial enclosure comprises a cross section that is circular, rectangular, or polygonal.

19. The apparatus of claim 17, wherein the flared wedge is welded to the partial enclosure.

20. The apparatus of claim 17, wherein the flared wedge is integral with the partial enclosure.

* * * * *